(12) United States Patent
Gabelgaard

(10) Patent No.: US 6,231,682 B1
(45) Date of Patent: May 15, 2001

(54) METHOD FOR WASHING REACTOR PRESSURE VESSEL ROD ELEMENTS

(76) Inventor: Keld Gabelgaard, Fichtenstrasse 8, 71717 Beilstein (DE)

(*) Notice: Subject to any disclaimer, the term of this patent is extended or adjusted under 35 U.S.C. 154(b) by 0 days.

(21) Appl. No.: 09/415,407

(22) Filed: Oct. 8, 1999

(30) Foreign Application Priority Data

Oct. 9, 1998 (DE) ............................................. 198 46 591

(51) Int. Cl.[7] ................................. B08B 3/02; B08B 3/04; B08B 5/04
(52) U.S. Cl. ............................. 134/15; 134/21; 134/25.1; 134/26; 134/42; 15/302
(58) Field of Search ............................ 134/21, 25.1, 15, 134/26, 42; 15/302

(56) References Cited

U.S. PATENT DOCUMENTS

| | | | |
|---|---|---|---|
| 3,807,599 | * 4/1974 | Schettler et al. | 220/85 R |
| 4,072,559 | * 2/1978 | Neidl et al. | 376/253 |
| 4,171,002 | * 10/1979 | Smith | 134/166 R |
| 4,298,015 | * 11/1981 | Garza | 134/100 |
| 4,621,652 | 11/1986 | Ozawa . | |
| 4,705,575 | * 11/1987 | Koch | 134/24 |
| 5,002,079 | 3/1991 | Cadwell et al. . | |
| 5,092,355 | 3/1992 | Cadwell et al. . | |
| 5,267,280 | * 11/1993 | Duguesne | 376/260 |
| 5,467,791 | 11/1995 | Kato et al. . | |

FOREIGN PATENT DOCUMENTS

| | | |
|---|---|---|
| 3230520 | 2/1984 | (DE) . |
| 3617739 | 12/1987 | (DE) . |
| 4129362 | 5/1992 | (DE) . |

* cited by examiner

*Primary Examiner*—Zeinab El-Arini
(74) *Attorney, Agent, or Firm*—Wood, Phillips, VanSanten, Clark & Mortimer

(57) ABSTRACT

A method for washing rod elements used in reactor pressure vessels with a fluid that includes the steps of (a) moving the rod elements from a pressure vessel through an open centered frame; (b) during the performance of step (a), impinging at least one fluid under pressure on the rod elements from at least one outflow orifice on the frame; and (c) simultaneously with the performance of step (b), withdrawing the fluid impinged upon the rod elements during step (b) under suction at at least one suction extraction orifice on the frame at a location peripherally spaced from the outflow orifices.

9 Claims, 3 Drawing Sheets

METHOD FOR WASHING REACTOR PRESSURE VESSEL ROD ELEMENTS

FIELD OF THE INVENTION

The present invention relates to a device and a method for washing around rod elements, in particular for cleaning fuel elements in order to avoid the uncontrolled stripping of the impurities adhering to the surface of the cladding tubes of fuel elements, during the transport of the fuel elements, for example from the reactor pressure vessel to appropriately provided fuel element storage racks.

BACKGROUND OF THE INVENTION

After their period of use in the reactor, the spent fuel elements are extracted from the reactor and, before further processing, are first stored intermediately in a fuel element store. After the shutdown of the plant and the reduction in temperature, the impurities adhering to the surface of the cladding tubes of fuel elements, and designated in power station terminology as "crud", come loose. This stripping effect is intensified when the fuel elements are being transported under water from the reactor pressure vessel to the fuel element storage racks or from the fuel element storage racks to the transport containers. During unloading under water, the previously flooded container is lowered into the unloading part of the store which is designed as a water pool. After the transport containers have been opened, the 4–5 metre long fuel elements are extracted from the container with the aid of underwater gripping tools, are inserted into cans and are introduced into the storage racks by means of a crane. The water serves as a shield and at the same time ensures an excellent view during unloading manipulations. On the other hand, however, as mentioned, because of its flow movement it also at the same time assists the effect of stripping the crud from the fuel elements, with the result that the fuel element storage pool becomes contaminated.

SUMMARY OF THE INVENTION

Accordingly, one object of the present invention is, in order to avoid the uncontrolled stripping of the crud, to provide a device and a corresponding method, with the aid of which the fuel elements can be cleaned when being lifted out of the storage rack or the rack in the reactor pressure vessel. Since similar problems may arise with regard to other rod elements, such as, for example, filter cartridges in industrial uses, the object of the present invention is, in general, to provide a device and a method for washing around rod elements. The aim in this case is, in particular, to avoid contamination of the surroundings.

According to the invention, this object is achieved by means of a device and a method, such as are defined in the independent claims. Expedient developments are specified in the subclaims.

According to the invention, a device is provided which serves for washing around at least one rod element with at least one liquid and/or at least one gas, the device having at least the following elements:

a) at least one frame with a top side and an underside and with at least one first and at least one second circumferential portion for leading through the at least one rod element, b) the frame having, in at least the second circumferential portion, at least one suction-extraction orifice for liquid and/or gas, and c) the device having at least one discharge line for liquid and/or gas from the at least one suction-extraction orifice of the frame.

The rod element may, in this case, have any desired shape and any desired cross section. The frame must then be adapted, as appropriate, to this shape. The frame may at the same time consist of one or more parts which can be connected to one another or else separated from one another. The first and second circumferential portions of the frame are freely selected portions of the circumference of the frame. In the case of a rectangular frame, one circumferential portion may correspond approximately to one side of the rectangle, though the circumferential portion may also be composed of two, in particular mutually contiguous sides or of parts of a plurality of sides of the rectangle. The suction-extraction orifice in the second circumferential portion of the frame may be an orifice of any desired cross section which is connected to a suction device, so that liquid or gas can be suction-extracted. Suction extraction is carried out by suction means, for example a suction pump, which is separate from the frame or is connected to the frame. The liquid, or corresponding gas, serving for washing around are then removed via the discharge line. In use for nuclear power stations in which the fuel elements are handled under water, it is expedient to have an underwater suction appliance which is connected to the suction-extraction orifices. The liquid, or corresponding gas, used for washing around can be extracted from the surroundings of the frame, so that the washing-around action is brought about solely by the suction action of the suction-extraction orifices. In this case, in nuclear power stations, the water of the fuel element pool or storage pool is simply used as washing liquid.

In a preferred embodiment, however, the frame has, in at least the first circumferential portion, at least one outflow orifice for the at least one liquid and/or the at least one gas. At the same time, the device possesses a supply line for supplying the at least one liquid and/or the at least one gas to the at least one outflow orifice of the frame. There is therefore the possibility of guiding the at least one liquid and/or the at least one gas under an essentially freely selectable pressure, which is predetermined only by the prerequisites of the device, through the supply line to the at least one outflow orifice and of thereby causing the at least one liquid and/or the at least one gas to impinge onto the at least one rod element. Within the scope of the invention, a high pressure is usually advantageous for the washing-around efficiency. Moreover, this arrangement affords the advantage that the washing-around substance can be freely selected within particular limits, that is to say is not limited to the medium specifically present in the surroundings, for example air or water. Since the washing substance is suction-extracted again, it is possible to use even substances which are not to enter the surroundings, or not in overly large quantities, or which are to be recovered for economic reasons.

In nuclear power stations, washing around serves primarily for cleaning the surface of the fuel elements, as described above. In this case, pool water or make-up water is used for washing around. At the same time, an underwater sucker is preferably used for suction extraction.

Preferably, the frame surrounds the rod element completely, so as to ensure that the at least one rod element is washed round completely. Preferably, washing around the at least one rod element serves for cleaning the surface of the latter, and for reasons of efficiency this is expediently achieved by washing around the rod element with the at least one liquid and/or with the at least one gas as completely as possible. Complete surrounding by the frame does not mean, here, that the frame must consist of one part or of parts connected fixedly to one another. It is sufficient if there are no relatively large gaps between the frame parts, so that no relevant part of the rod element remains untreated, that is to say unaffected by make-up water.

In a further preferred embodiment, at least one sealing element is arranged on the top side and/or underside of the frame in such a way as to achieve sealing off relative to the rod element. As a result, when the at least one rod element is led through the frame, the fraction of loosened and actually suction-extracted constituents, for example the "crud", is increased. This may be achieved simply by increasing the suction action in the more highly sealed-off regions surrounding the rod element. However, leading the rod element through this sealing element may also result in mechanical stripping of the rod element, by virtue of which loosely adhering impurity particles are detached from the surface of the rod element. It becomes apparent from this that "sealing-off" does not mean a liquid-tight or gas-tight seal, but a definition of a space around the rod element, leading to a more efficient suction behaviour in that there is a reduction in surrounding medium being sucked in.

In a preferred embodiment, the frame has a rectangular shape, two mutually contiguous sides of the rectangle each having at least one outflow orifice and the other two sides each having at least one suction-extraction orifice. This diagonal arrangement of the outflow orifices relative to the suction-extraction orifices makes it possible to carry out the simultaneous treatment, in particular the simultaneous cleaning of the rod element from two sides. If this preferred embodiment is not used, the device may also be rotated and thus wash around the rod element in successive operations. It is also possible, in this case, to rotate the frame continuously or at specific time intervals during the movement of the rod element through the frame and consequently to clean the rod element from all sides.

In a preferred embodiment, the discharge lines as a whole have a larger cross section than the supply lines as a whole. This ensures that, with the aid of the suction-extraction orifice and the discharge lines, it is possible to accommodate or suction-extract at least the liquid volume and/or gas volume which is fed in through the supply lines, plus the impurity particles which are contained or dissolved in the at least one liquid and/or the at least one gas after washing around and which are flushed away from the surface of the at least one rod element by washing around. A continuous flow is thus maintained between the outflow orifices and the suction-extraction orifices, without the risk of a build-up of the liquid supplied or of the gas supplied due to a lack of suction-extraction capacity.

In a further preferred embodiment, the frame has at least one device for generating ultrasonic oscillations. Consequently, the liquid washing around the at least one rod element, in addition to being moved in the direction of one of the suction-extraction orifices by virtue of the suction action emanating from these, is also put into a kind of state of vibration. This, in turn, brings about a better cleaning effect of the liquid and/or gas washing around the rod element.

In addition, the ultrasonic oscillations also directly ensure that impurity particles are stripped from the surface of the rod element more easily.

Furthermore, in the present invention, a method for washing around at least one rod element with at least one liquid and/or one gas is provided, the method at the same time having at least the following steps:

a) the supply of the at least one liquid and/or of the at least one gas to the at least one rod element, b) the suction extraction of liquid and/or gas by suction-extraction orifices which are arranged on at least one second circumferential portion of a frame, and c) the leading of the at least one rod element through the frame.

The continuous supply to and the simultaneous suction extraction of liquid and/or gas from the at least one rod element causes the rod element to be washed around constantly with the corresponding liquid and/or gas. The result of this, in turn, is that between the surface of the rod element and the liquid and/or gas flowing round this surface there are constantly frictional effects by virtue of which impurity particles on the surface of the rod element can be stripped off and entrained together with the flowing liquid and/or gas. The actual cleaning effect is based on this. Furthermore, by a liquid and/or gas being suction-extracted, the impurity particles stripped off from the surface of the rod element are suction-extracted together with the corresponding liquid and/or the corresponding gas, this also largely preventing renewed accretion onto the surface of the rod element.

In a preferred embodiment of the method according to the invention, the at least one liquid and/or the at least one gas is supplied to outflow orifices which are arranged on at least one first circumferential portion of the frame. In this case, the at least one liquid and/or the at least one gas is introduced preferably at a pressure of between 3 bar and 150 bar, preferably of between 10 bar and 30 bar, so that the at least one liquid and/or the at least one gas impinges onto the at least one rod element with a relatively high momentum. Even the mere "brushing" of the liquid and/or gas past the surface of the rod element entails increased friction and therefore a greater effect of stripping off impurity particles located on the rod surface, that is to say the cleaning effect is greater than if the pressure is lower.

The described method according to the invention and/or the device according to the invention are used preferably for cleaning fuel elements of nuclear power stations. As already explained in the introduction, contamination in the reactor pool of a nuclear power station and in the fuel element storage pool is caused by the impurities, crud, adhering for the most part to the surface of the cladding tubes of fuel elements. After the plant has been shut down and the temperature reduced, the crud comes loose from the surface. This stripping effect is increased during the transport of the fuel elements, usually under water, between the reactor pressure vessel and the fuel element storage racks or between the fuel element storage rack and the transport containers. The fuel elements are moved in the water in a suspended position by means of a loading machine or other gripping device. The pool water at the same time flows through the cladding tubes. In order to avoid the uncontrolled stripping-off of the crud on the fuel element cladding tubes, the method according to the invention or the device according to the invention is used according to the invention in order to carry out one or else a plurality of successive cleaning steps when the fuel elements are being lifted vertically out of the storage racks or the rack in the reactor pressure vessel, so that the impurities no longer enter the reactor pool or the fuel element storage pool, but are already eliminated beforehand.

Preferably, during removal, the fuel elements are led in a vertical orientation through the frame of the device according to the invention and at the same time cleaned.

Preferably, in this case, single-stage diagonal washing is carried out for cleaning purposes. The device according to the invention has, in this case, preferably a rectangular frame. Arranged on this frame is a lateral supply line which leads from the top downwards and which, in turn, is provided preferably with branches to nozzle-shaped mutually adjacent outflow orifices in the frame. These outflow orifices are provided preferably on two mutually contiguous sides of the rectangular frame. On the remaining two opposite sides of the rectangular frame are allocated the discharge lines as a whole, which are designed in a similar way to the supply lines as a whole, but with a substantially larger cross section. This affords the possibility, in a preferred procedure, of feeding in make-up water at high pressure, preferably in a range of from 3 bar to 150 bar, particularly preferably of from 10 bar to 30 bar, on the supply side and of suction-extracting the said make-up water again at a high vacuum on the opposite side by means of an underwater sucker. The arrangement of the outflow orifices in relation to the suction-extraction orifices thus results in a flow or wash which is diagonal with respect to the frame. This diagonal technique makes it possible to surround the fuel element completely and to carry out treatment simultaneously from two sides. During diagonal washing, the liquid stream endeavours to travel through the bundle of fuel elements, and is then suction-extracted on the opposite side.

The method described may, however, also be employed without make-up water being fed in. In this case, use is then simply made of the surrounding medium, that is to say, for example, the pool water.

In a preferred embodiment, the single-stage diagonal washing according to the invention is improved by adding a second stage in the opposite direction. After the bundle of fuel elements has been led through the first frame, the same bundle is led through a second frame, while being continuously lifted vertically out of the storage rack or the rack in the reactor pressure vessel, in which case the outflow orifices and the suction-extraction orifices are then arranged, here, in such a way that a diagonal flow running counter to the diagonal flow resulting in the first frame is obtained. The two sides not yet treated when the bundle of fuel elements is led through the first frame are thereby treated, that is to say cleaned. This is two-stage diagonal washing.

In a further preferred embodiment, devices for generating ultrasonic oscillations, so-called ultrasonic oscillators, are used to reinforce the two diagonal washes mentioned above. These oscillators are arranged on the frame according to the invention. The liquid is set into a state of vibration by these ultrasonic oscillators, with the result that the cleaning effect is further intensified.

Other advantages, features and possibilities for use of the present invention may be gathered from the following description of exemplary embodiments, in conjunction with the drawings in which:

DESCRIPTION OF THE PREFERRED EMBODIMENT

Figure 1:
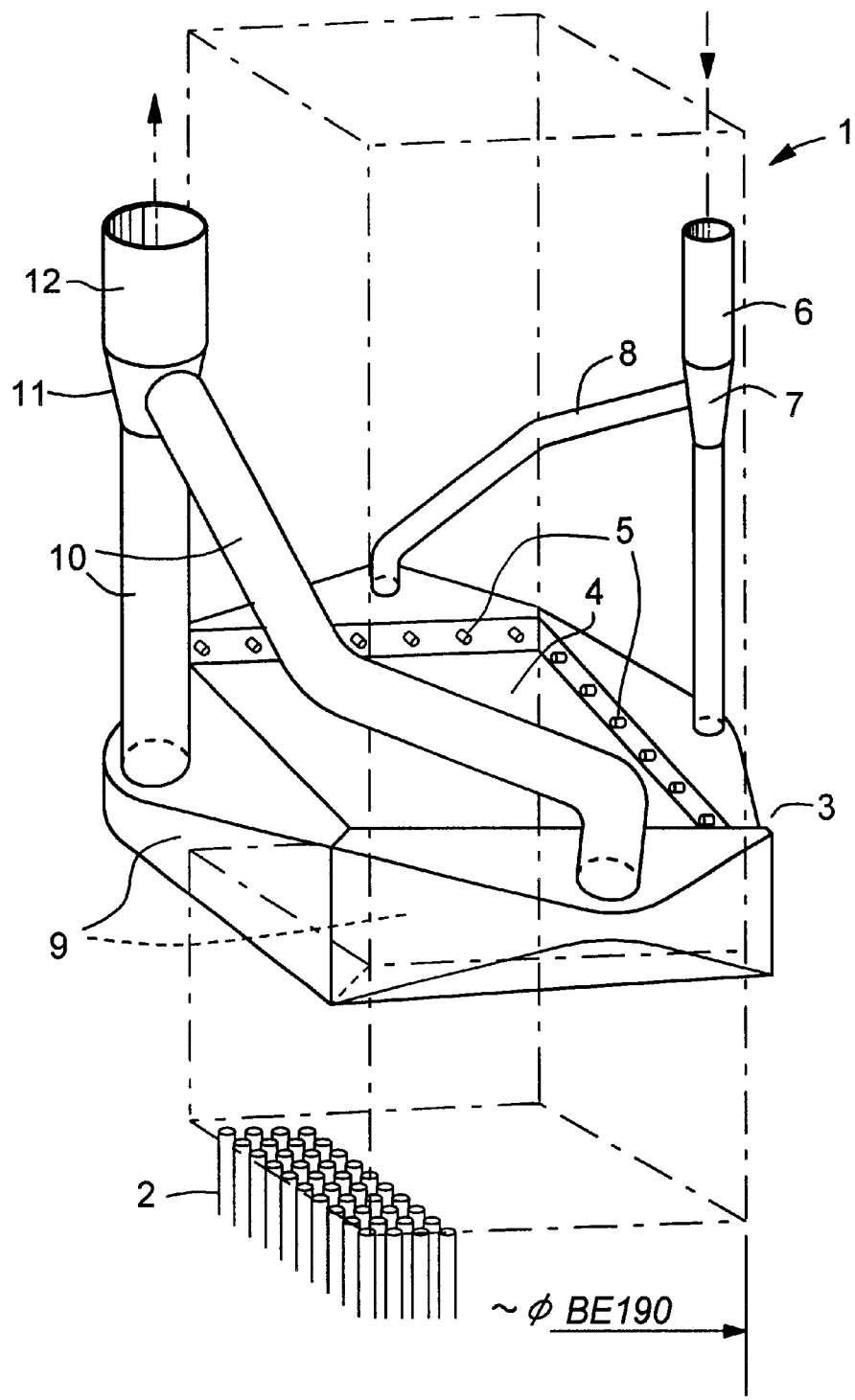
FIG. 1 shows a perspective illustration of a device according to the invention for washing around a bundle of fuel elements of a nuclear reactor, a liquid used for washing around being supplied at low pressure.

FIG. 1 illustrates a device 1 according to the invention, for washing around at least one rod element with at least one liquid and/or one gas. The device 1 illustrated here serves particularly for cleaning a bundle of fuel elements 2 while this bundle is being removed from a reactor pressure vessel or from a storage rack. The device frame 3 according to the invention forms a rectangular orifice 4, through which the bundle of fuel elements 2 is led. Two mutually contiguous inner sides of the frame 3 illustrated have in each case narrow slit-like orifices which extend over the entire side length and which serve as outflow orifices 5. In the illustration under consideration here, a supply line 6 for the liquid used for cleaning, in particular for make-up water, is located on the right-hand side. The supply line 6 runs vertically from the top downwards. In its upper portion, it has a branch point 7. From here, part of the introduced liquid is further guided vertically downwards to the first of the two outflow orifices 5 and the other part of the introduced liquid is diverted into a branch 8 to the second of the two outflow orifices 5. The two remaining mutually contiguous opposite inner sides of the frame 3 likewise in each case have an orifice serving as suction-extraction orifices 9. The cross section of the suction-extraction orifices 9 is larger than that of the outflow orifices 5. A discharge line 10 leads away from each of the suction-extraction orifices 9. The two discharge lines 10 illustrated here converge, in a connection piece 11, into an overall discharge line 12 having a larger cross section than the individual discharge lines 10. This overall discharge line leads vertically upwards. The bundle of fuel elements 2 is led in a vertical orientation through the frame 3. Simultaneously, liquid, in particular make-up water, is constantly fed in under low pressure through the supply line 6 and guided to the outflow orifices 5. It then flows there into the rectangular inner region of the frame 3, through which the bundle of fuel elements 2 is also led. When the bundle of fuel elements 2 is being led through, it is consequently washed round by the make-up water introduced which flows out of the outflow orifices 5. Liquid is suction-extracted from the inner region of the frame 3 at the suction-extraction orifices 9 located opposite the outflow orifices 5. The impurity particles from the surface of the individual fuel elements 2 which have been stripped off as a result of the washing-around operation and are now contained in the liquid are also suction-extracted, that is to say the surface of the fuel elements 2 is thus cleaned.

Figure 2:
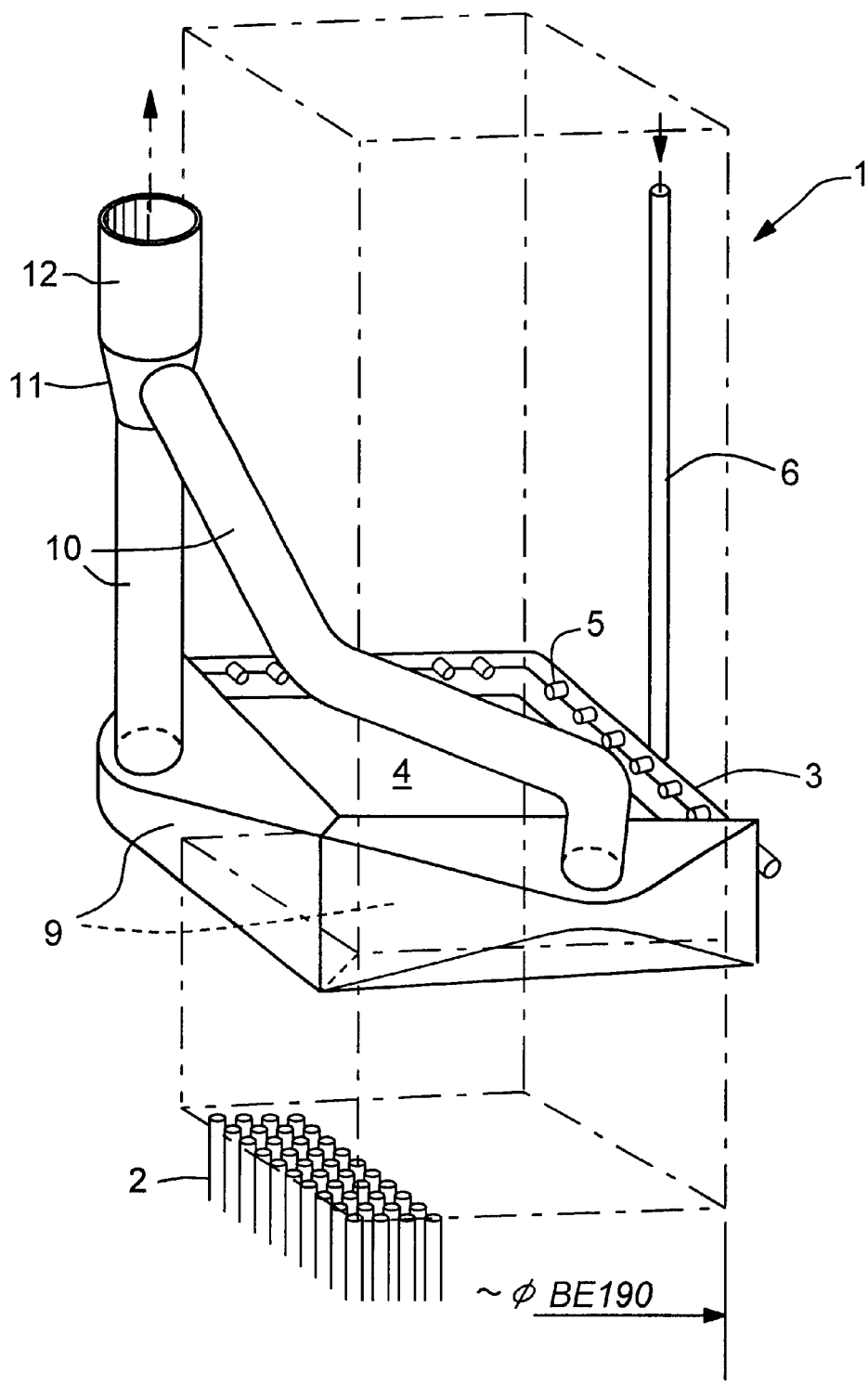
FIG. 2 shows a perspective illustration of another device according to the invention for washing around a bundle of fuel elements of a nuclear reactor, a liquid used for washing around being supplied at high pressure.

FIG. 2 illustrates in perspective another device 1 according to the invention for washing around at least one rod element with at least one liquid and/or one gas. The device 1 illustrated here also serves particularly for cleaning a bundle of fuel elements 2 while this bundle is being removed from the reactor pressure vessel or from a storage rack. Here too, the device 1 has a rectangular frame 3, through which a bundle of fuel elements 2 can be led in a vertical orientation. Whilst the discharge lines 10, the overall discharge line 12 and the suction-extraction orifices 9 do not differ from those in FIG. 1, both the supply line 6 and the outflow orifices 5 are designed differently from that which is illustrated in FIG. 1. The supply line 6 has a comparatively small cross section. Moreover, it does not have a branch point in its upper portion. It directly leads vertically downwards to a first side of the rectangular frame 3. Part of the liquid fed in is diverted only directly at the frame 3 to a second side of the frame 3 which is contiguous with this first side. A plurality of adjacent nozzle-shaped outflow orifices 5 are located in each case on this first and second side of the frame 3. These outflow orifices 5 are likewise substantially smaller than the two outflow orifices in FIG. 1. In contrast to FIG. 1, here the liquid supplied flows under high pressure out of the outflow orifices 5 into the inner region of the frame 3. The principle of leading a bundle of fuel elements 2 through the frame 3 is similar to that described in relation to FIG. 1. Here, however, the liquid flowing out of the outflow orifices 5 impinges onto or brushes against the individual fuel elements with a higher momentum, with the result that more impurity particles can be stripped off from the surface of the individual fuel elements 2, that is to say the cleaning of the fuel elements is more efficient, as compared with the procedure described in relation to FIG. 1.

Figure 3:
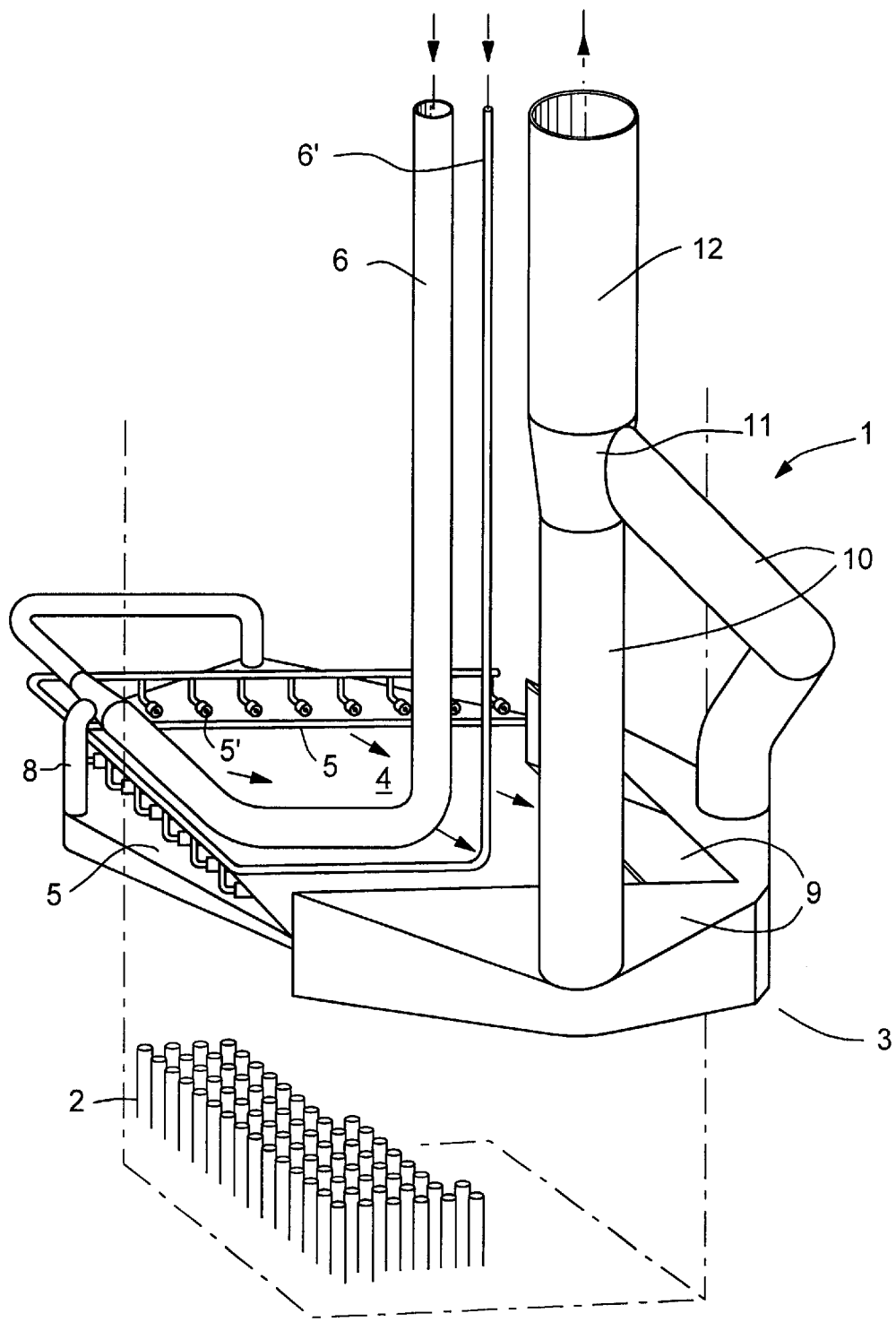
FIG. 3 shows a perspective illustration of a further device according to the invention for washing around a bundle of fuel elements of a nuclear reactor, where a liquid used for washing around can be supplied selectively at low pressure or at high pressure.

FIG. 3 again illustrates a further device 1 according to the invention for washing around at least one rod element with at least one liquid and/or one gas. The device 1 illustrated here also serves particularly for cleaning a bundle of fuel elements 2 while this bundle is being removed from the reactor pressure vessel or from a storage rack. The device 1 shown here is a combination of the device illustrated in FIG. 1 and that illustrated in FIG. 2. The discharge lines as a whole are similar to those illustrated in FIG. 1 or FIG. 2. The device I illustrated here likewise has a rectangular frame 3, but possesses two different supply lines which can be used selectively. The supply line 6 is designed in a similar way to FIG. 1 and makes it possible to work under low pressure. The corresponding outflow orifices 5 are slot-like orifices extending over the entire side length, exactly as in FIG. 1. The other selectively available supply line 6' has a comparatively very small cross section, in a similar way to FIG. 2. The associated nozzle-shaped outflow orifices 5' are likewise substantially smaller in cross section than the outflow orifices 5. The combination of the two embodiments of FIGS. 1 and 2 makes a flexible operating mode possible. Work may be carried out under low pressure or under high pressure depending on the degree of contamination of the fuel elements 2.

The present invention thus constitutes a device and a method for washing around, in particular for cleaning, rod elements, such as, for example, nuclear fuel elements, which allow rapid and simple treatment on site.

What is claimed is:

1. A method for washing at least one rod element used in a reactor pressure vessel with at least one fluid, comprising the steps of:

a) moving at least one rod element from a reactor pressure vessel through an open centered frame;

b) during the performance of step a) impinging at least one fluid under pressure on the rod element(s) from at least one outflow orifice on the frame; and c) simultaneously with the performance of step b), withdrawing the fluid impinged upon the rod element(s) during step b) under suction at at least one suction-extraction orifice on the frame at a location peripherally spaced from said outflow orifice(s).

2. The method of claim 1 wherein the fluid is a liquid.

3. The method of claim 1, wherein the fluid is a gas.

4. The method of claim 1 wherein step b) includes the step of directing the fluid at the open center of the frame.

5. The method of claim 4 wherein step c) includes locating the suction extraction orifice(s) to open toward the open center of the frame.

6. The method of claim 1 wherein the step a) is performed by vertically and upwardly moving the rod elements through the open center of the frame.

7. The method of claim 1 wherein the fluid is introduced at a pressure in the range of 3–150 bar.

8. The method of claim 7 wherein the pressure is in the range of 10–30 bar.

9. The method of claim 1 wherein the open center of the frame is generally rectangular having first, second, third and fourth sides and there is at least one of said outflow orifices on each of said first and second sides and at least one of said suction-extraction orifices on each of said third and fourth sides.

* * * * *